United States Patent
Monshizadeh et al.

(10) Patent No.: US 11,849,011 B2
(45) Date of Patent: Dec. 19, 2023

(54) ENABLING ETHERNET COMMUNICATION OVER IP TRANSPORT

(71) Applicant: Nokia Solutions and Networks Oy, Espoo (FI)

(72) Inventors: Mehrnoosh Monshizadeh, Saint Germain les Arpajon (FR); Vikramajeet Khatri, Espoo (FI); Kari Jukka Tapio Tiirikainen, Vantaa (FI); Catello Di Martino, Uberlandia (BR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/160,524

(22) Filed: Jan. 27, 2023

(65) Prior Publication Data
US 2023/0247114 A1    Aug. 3, 2023

(30) Foreign Application Priority Data
Jan. 31, 2022   (FI) ..................................... 20225080

(51) Int. Cl.
*H04W 36/14*    (2009.01)
*H04L 69/085*    (2022.01)
(Continued)

(52) U.S. Cl.
CPC .......... *H04L 69/085* (2022.05); *H04L 69/166* (2013.01); *H04L 69/22* (2013.01); *H04W 36/14* (2013.01); *H04W 88/16* (2013.01)

(58) Field of Classification Search
CPC ... H04B 7/0617; H04B 7/0695; H04L 5/0044; H04L 5/0053; H04W 16/28; H04W 72/20
See application file for complete search history.

(56) References Cited

U.S. PATENT DOCUMENTS

| | | |
|---|---|---|
| 2011/0261812 A1 | 10/2011 | Kini et al. |
| 2020/0021557 A1 | 1/2020 | Shikata et al. |

(Continued)

FOREIGN PATENT DOCUMENTS

| | | | |
|---|---|---|---|
| EP | 3852433 A1 * | 7/2021 | ............. H04L 69/22 |
| EP | 3852433 A1 | 7/2021 | |

(Continued)

OTHER PUBLICATIONS

Hinden et al.,"IP Version 6 Addressing Architecture", RFC 4291, Network Working Group, Feb. 2006, pp. 1-25.
(Continued)

*Primary Examiner* — Lakeram Jangbahadur
(74) *Attorney, Agent, or Firm* — Nokia Technologies Oy

(57) ABSTRACT

In accordance with an example embodiment of the present disclosure Ethernet communication over IP transport is enabled. The following is performed: Ethernet communication for transmitting and receiving Ethernet frames; IP communication for transmitting and receiving IP data packets over a cellular network; transforming Ethernet frames to IP data packets and vice versa for enabling Ethernet communication over IP transport; and maintaining a header transformation table between Ethernet and IP traffic flows. The transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames, wherein the transforming comprises using IPv6 headers of IP data packets to carry dynamic information from the removed Ethernet headers.

14 Claims, 6 Drawing Sheets

(51) Int. Cl.
  *H04L 69/166* (2022.01)
  *H04L 69/22* (2022.01)
  *H04W 88/16* (2009.01)

(56) References Cited

U.S. PATENT DOCUMENTS

2020/0107221 A1* 4/2020 Prakash ............... H04L 69/22
2021/0185752 A1 6/2021 Samuel et al.

FOREIGN PATENT DOCUMENTS

WO 2020/036882 A1 2/2020
WO 2020/092780 A1 5/2020
WO WO-2020092780 A1 * 5/2020

OTHER PUBLICATIONS

Gebert et al., "Comparison of Provider Backbone Bridging, TRILL, GRE and GTP-U in 5G for Time Sensitive Industrial Applications", IEEE Conference on Standards for Communications and Networking (CSCN), Oct. 29-31, 2018, 6 pages.

Garcia et al.,"The Ethernet Frame Payload Size and Its Effect on IPv4 and IPv6 Traffic", International Conference on Information Networking, Jan. 23-25, 2008, 5 pages.

"3rd Generation Partnership Project; Technical Specification Group Radio Access Network; Evolved Universal Terrestrial Radio Access (E-UTRA); Packet Data Convergence Protocol (PDCP) specification (Release 16)", 3GPP TS 36.323, V16.3.0, Dec. 2020, pp. 1-56.

"3rd Generation Partnership Project; Technical Specification Group Radio Access Network; NR; Packet Data Convergence Protocol (PDCP) specification (Release 16)", 3GPP TS 38.323, V16.4.0, Jun. 2021, pp. 1-40.

"3rd Generation Partnership Project; Technical Specification Group Services and System Aspects; General Packet Radio Service (GPRS) enhancements for Evolved Universal Terrestrial Radio Access Network (E-UTRAN) access (Release 17)", 3GPP TS 23.401, V17.2.0, Sep. 2021, pp. 1-448.

"3rd Generation Partnership Project; Technical Specification Group Services and System Aspects; System architecture for the 5G System (5GS); Stage 2 (Release 17)", 3GPP TS 23.501, V17.2.0, Sep. 2021, pp. 1-542.

"3rd Generation Partnership Project; Technical Specification Group Services and System Aspects; Procedures for the 5G System (5GS); Stage 2 (Release 17)", 3GPP TS 23.502, V17.2.1, Sep. 2021, pp. 1-712.

"3rd Generation Partnership Project; Technical Specification Group Services and System Aspects; Policy and charging control framework for the 5G System (5GS); Stage 2 (Release 17)", 3GPP TS 23.503, V17.2.0, Sep. 2021, pp. 1-141.

"IEEE 802", Wikipedia, Retrieved on Jan. 23, 2023, Webpage available at : https://en.wikipedia.org/wiki/IEEE_802.

"IEEE 802.1q", Wikipedia, Retrieved on Jan. 23, 2023, Webpage available at : https://en.wikipedia.org/wiki/IEEE_802.1Q.

Office Action received for corresponding Finnish U.S. Appl. No. 20/225,080, dated Jun. 29, 2022, 6 pages.

"Ethernet Header Compression", 3GPP TSG-RAN WG2 #103bis, R2-1814811, Agenda Item: 11.7.2, Ericsson, Oct. 8-12, 2018, 5 pages.

Office Action received for corresponding Finnish U.S. Appl. No. 20/225,080, dated Nov. 3, 2022, 5 pages.

Extended European Search Report received for corresponding European Patent Application No. 23153594.9, dated Jun. 13, 2023, 6 pages.

Kini et al., "Encapsulation Methods for Transport of packets over an MPLS PSN—efficient for IP/MPLS", Internet-Draft, MPLS Working Group, Mar. 14, 2011, 26 pages.

Maino et al., "LISP Generic Protocol Extension", Internet-Draft, Internet Engineering Task Force, Aug. 15, 2018. pp. 1-10.

Wang et al., "An Application QoS Based Conversion Scheme Between Ethernet/IP and IPv6", Chinese Automation Congress (CAC), Nov. 6-8, 2020, pp. 5922-5927.

* cited by examiner

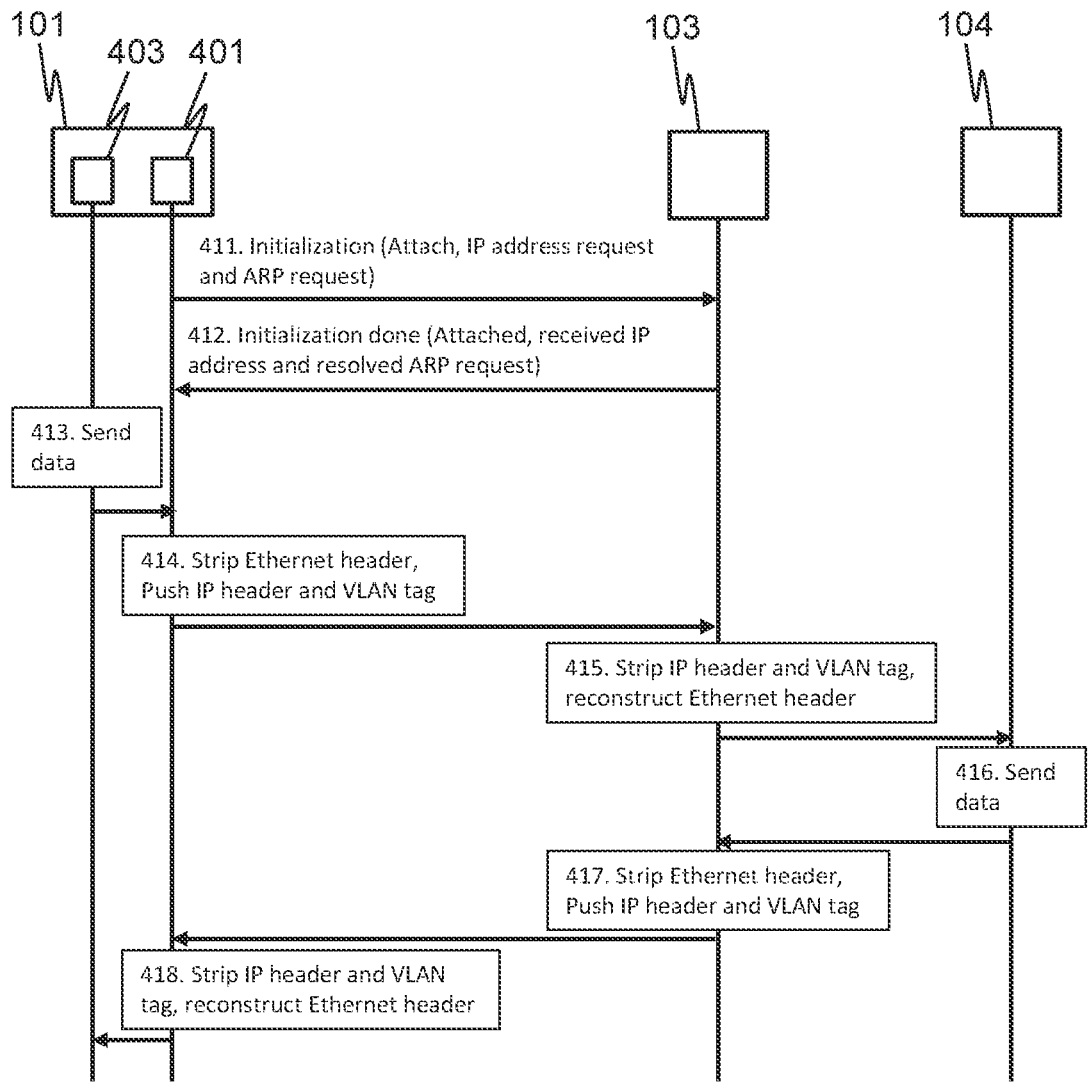

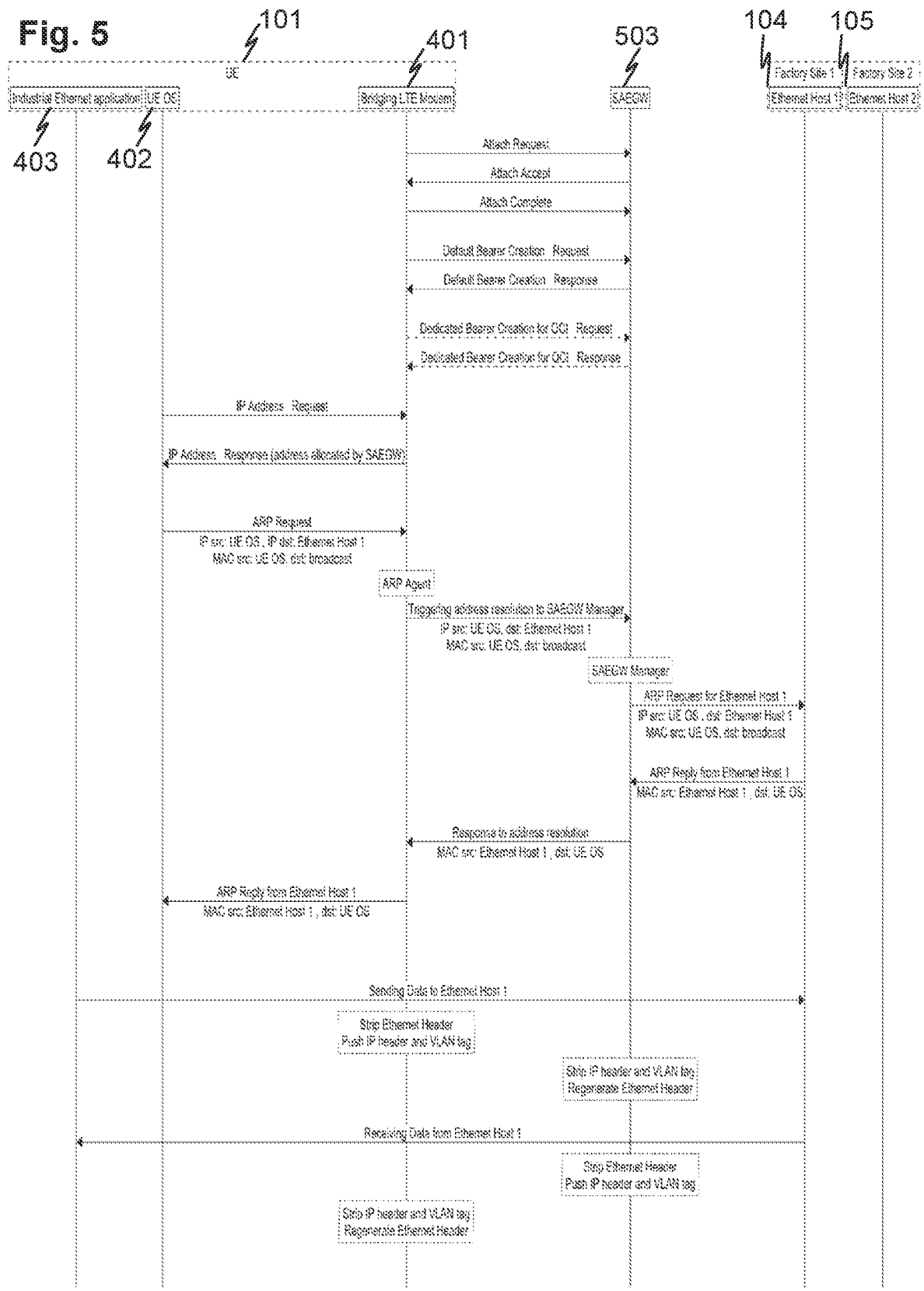

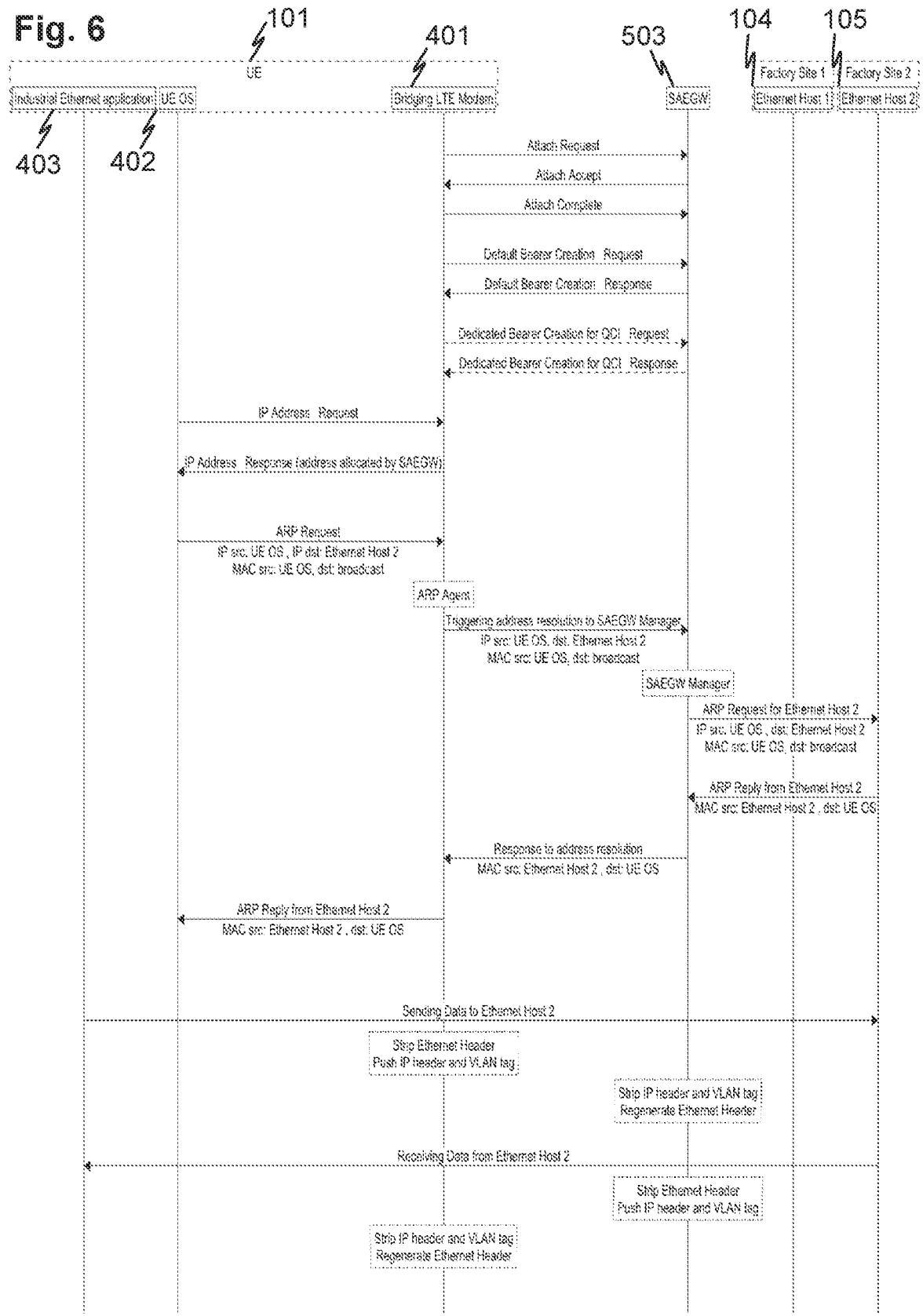

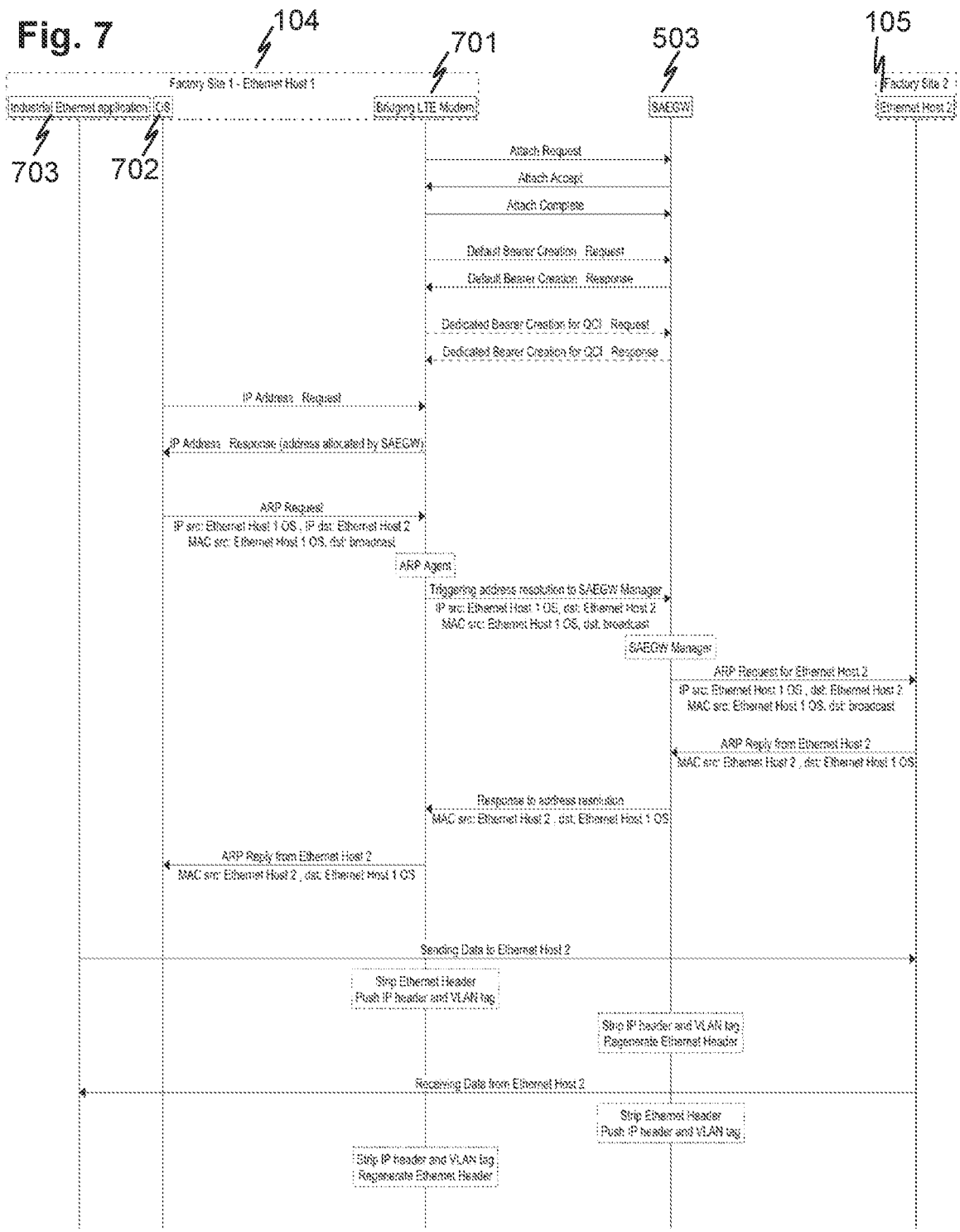

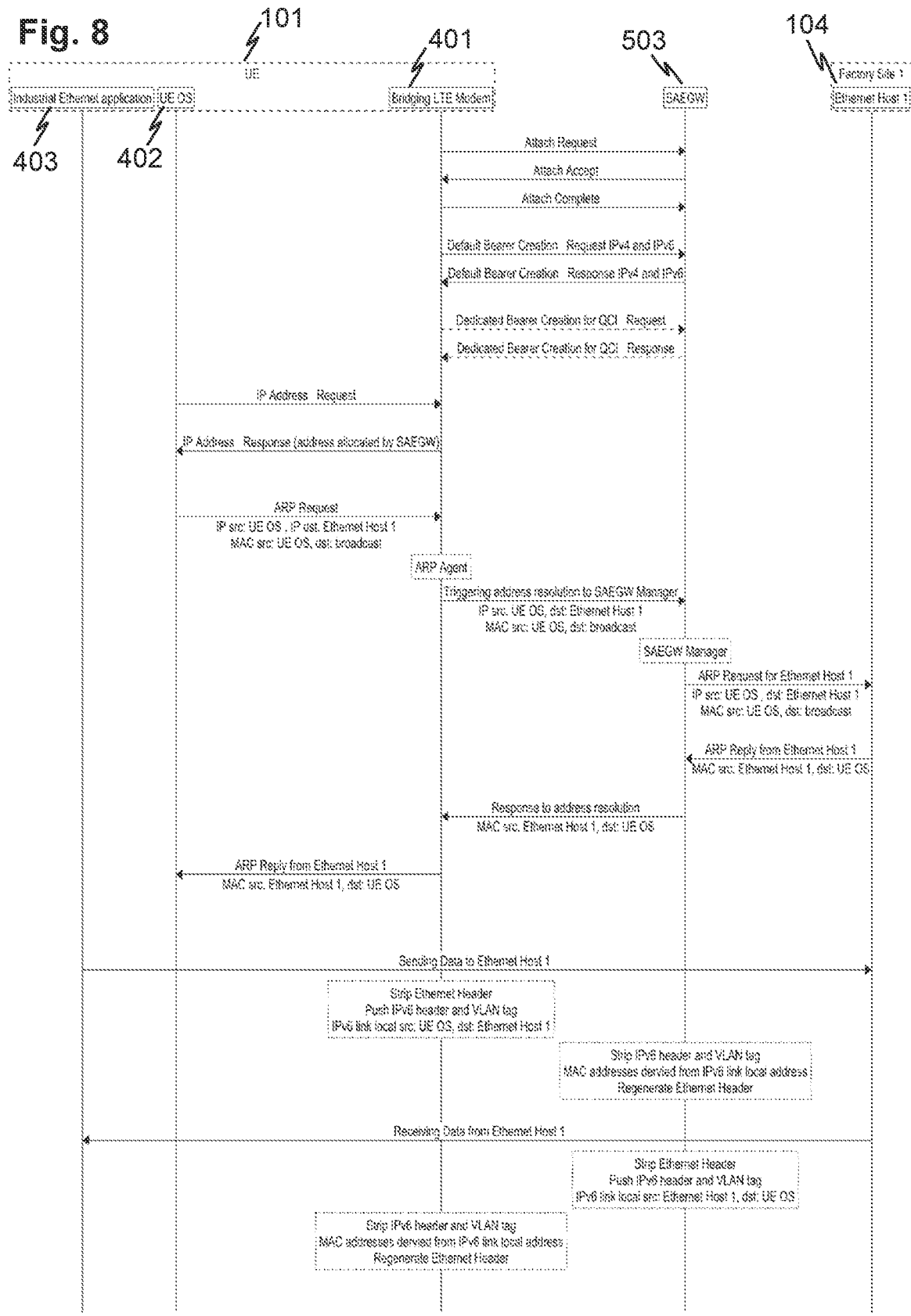

ENABLING ETHERNET COMMUNICATION OVER IP TRANSPORT

TECHNICAL FIELD

Various example embodiments relate to enabling Ethernet communication over IP transport.

BACKGROUND

This section illustrates useful background information without admission of any technique described herein representative of the state of the art.

Many industrial networks and protocols rely on Ethernet communication and in some cases TCP/IP is only used for Ethernet station discovery while all further communication takes place using native Ethernet. One example of such industrial Ethernet protocol is Profinet and its low latency variant Profinet RT. However, in cellular networks such as LTE network, a user equipment (UE) may be provided only with an IP address by the System Architecture Evolution Gateway (SAEGW). This IP only transport, called a bearer in LTE, does not natively enable Ethernet communication, which is required to enable industrial Ethernet communication over cellular networks.

Thus, there is a need to enable Ethernet communication in a cellular network over IP transport, such as the LTE bearer. One solution for this has been to create a layer 2 tunnel and encapsulating the entire Ethernet frame as IP payload for delivery over IP transport. These encapsulated Ethernet frames are then decapsulated at the receiving end. However, such tunnelling solution causes transmission overhead due to the encapsulation procedure and additional headers as well as operational overhead due to management and configuration of the tunnel.

There are specifications to support non-IP based Ethernet transport in 4G and 5G networks, but such functionality is not necessarily supported in all implementations.

Based on this, there is room for further considerations for enabling Ethernet communication over IP transport.

SUMMARY

The scope of protection sought for various embodiments of present disclosure is set out by the independent claims. The embodiments and features, if any, described in this specification that do not fall under the scope of the independent claims are to be interpreted as examples useful for understanding various example embodiments.

According to a first example aspect of the present disclosure, there is provided an apparatus comprising means for performing:

Ethernet communication for transmitting and receiving Ethernet frames; IP communication for transmitting and receiving IP data packets over a cellular network;
transforming Ethernet frames to IP data packets and vice versa for enabling Ethernet communication over IP transport; and
maintaining a header transformation table between Ethernet and IP traffic flows; wherein
said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using IPv6 headers of IP data packets to carry dynamic information from the removed Ethernet headers.

In some example embodiments, the transforming comprises using source and destination address fields of IPv6 headers of IP data packets to carry source and destination addresses of the removed Ethernet frames.

In some example embodiments, the transforming comprises using traffic class and flow label fields of IPv6 headers of IP data packets to carry dynamic information from the removed Ethernet headers.

In some example embodiments, the header transformation table comprises Ethernet addresses and respective IP addresses.

In some example embodiments, the transforming comprises using IPv6 fragmentation header to enable transport of Ethernet payloads that are larger than the IP data packets can accommodate.

In some example embodiments, the transforming and said maintaining a header transformation table further comprise enabling Ethernet communication between an industrial Ethernet application of user equipment and an industrial Ethernet host.

In some example embodiments, the apparatus is a network element of a cellular core network.

In some example embodiments, the apparatus is a packet data network gateway, P-GW, node of a system architecture evolution gateway, SAEGW, in an evolved packet core, EPC.

In some example embodiments, the apparatus is a user plane function, UPF, node in a 5G core network, 5GC.

In some example embodiments, the apparatus is, or is comprised in, user equipment.

In some example embodiments, the means are further configured to perform acquiring a new IP address for Ethernet over IP transport, if needed after a cellular handover, wherein the new IP address is obtained using the address resolution mechanisms of TCP/IP.

In some example embodiments, the apparatus is a bridging LTE modem of user equipment.

In some example embodiments, the apparatus is a bridging NR modem of user equipment.

In some example embodiments, the means comprises at least one processor; and at least one memory including computer program code, the at least one memory and computer program code configured to, with the at least one processor, cause the performance of the apparatus.

According to a second example aspect of the present disclosure, there is provided a method, comprising:
performing Ethernet communication for transmitting and receiving Ethernet frames;
performing IP communication for transmitting and receiving IP data packets over a cellular network;
transforming Ethernet frames to IP data packets and vice versa for enabling Ethernet communication over IP transport; and
maintaining a header transformation table between Ethernet and IP traffic flows; wherein
said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using IPv6 headers of IP data packets to carry dynamic information from the removed Ethernet headers.

According to a third example aspect of the present disclosure, there is provided a computer program comprising instructions for causing an apparatus to perform at least the following:

Ethernet communication for transmitting and receiving Ethernet frames; IP communication for transmitting and receiving IP data packets over a cellular network;

transforming Ethernet frames to IP data packets and vice versa for enabling Ethernet communication over IP transport; and maintaining a header transformation table between Ethernet and IP traffic flows; wherein said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using IPv6 headers of IP data packets to carry dynamic information from the removed Ethernet headers.

The computer program may be stored in a non-transitory computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fourth example aspect of the present invention, there is provided an apparatus comprising a memory and a processor that are configured to cause the apparatus to perform Ethernet communication for transmitting and receiving Ethernet frames; IP communication for transmitting and receiving IP data packets over a cellular network;

transforming Ethernet frames to IP data packets and vice versa for enabling Ethernet communication over IP transport; and maintaining a header transformation table between Ethernet and IP traffic flows; wherein said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using IPv6 headers of IP data packets to carry dynamic information from the removed Ethernet headers.

Different non-binding example aspects and embodiments of the present invention have been illustrated in the foregoing. The embodiments in the foregoing are used merely to explain selected aspects or steps that may be utilized in implementations of the embodiment of the present disclosure. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a flow chart of a process of an example embodiment; and

FIGS. 4-8 show signaling diagrams of some example embodiments.

DETAILED DESCRIPTION OF THE DRAWINGS

An example embodiment of the present disclosure and its potential advantages are understood by referring to FIGS. 1 through 8 of the drawings. In this document, like reference signs denote like parts or steps.

Figure 1:
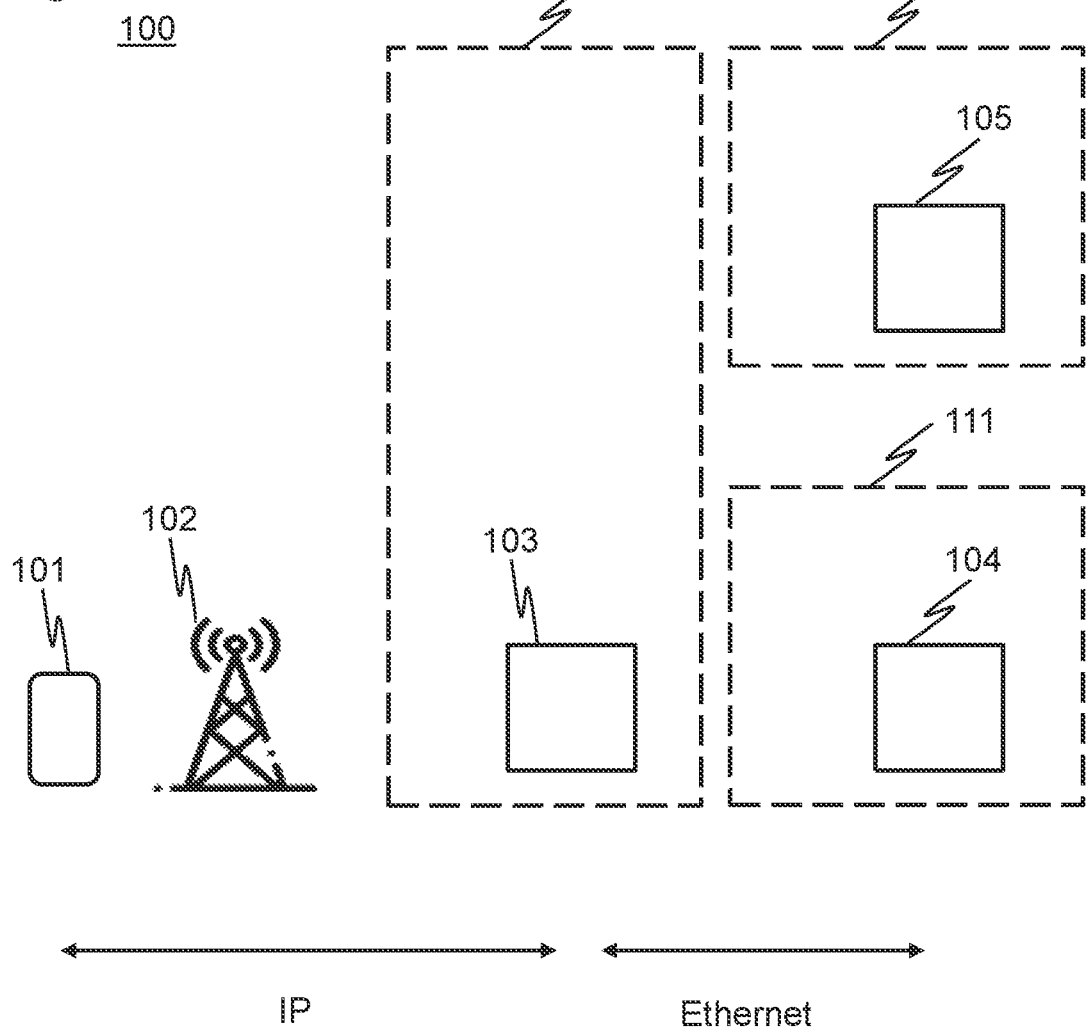
FIG. 1 shows an architectural drawing of a system of an example embodiment.

FIG. 1 shows an architectural drawing of a system of an example embodiment. FIG. 1 comprises a user equipment (UE) 101, a base station 102 (e.g., an eNodeB or gNodeB), a core network 110 of a cellular network, a network element 103 in the core network 110, a first factory site 111, a second factory site 112, a first Ethernet host 104 of the first factory site 111, and a second Ethernet host 105 of the factory site. It is to be noted that FIG. 1 is a simplified drawing showing merely entities needed for explaining various embodiments of present disclosure. It is clear, that a practical implementation may include various other entities. Further, some of the shown entities may be optional. For example, more than one factory site is not mandatory. Still further, instead of being part of a factory site, the Ethernet host may reside elsewhere without affecting operation of embodiments of present disclosure.

In operation, there may be IP transport between the UE 101 and the network element 103 and Ethernet transport between the network element 103 and the first Ethernet host 104 and/or the second Ethernet host 105. The network element 103 may be configured to implement various embodiments of present disclosure to enable Ethernet communication between the UE 101 (or an application running in the UE 101) and the first Ethernet host 104 and/or the second Ethernet host 105. At least certain embodiments of present disclosure may be implemented in the UE.

Various example embodiments suit well for 4G networks, but embodiments may be equally used in other networks, too. For example, if some 5G core network implementation does not support native Ethernet communication, various example embodiments of present disclosure may be used for enabling Ethernet communication over IP also in 5G networks.

For 4G core network (Evolved Packet Core, EPC) the network element 103 may be a System Architecture Evolution Gateway (SAEGW) or a Packet Data Network Gateway (P-GW) node of SAEGW. SAEGW is a combination of a Serving Gateway (S-GW) and at least one Packet Data Network Gateway (P-GW). Various example embodiments of present disclosure may be implemented in P-GW and possibly only some configuration changes may be needed in the S-GW. For 5G core network (5GC) various example embodiments of present disclosure may be implemented in User Plane Function (UPF) and possibly only some configuration changes may be needed in Session Management Function (SMF).

On the UE side, various embodiments of present disclosure may be implemented for example in a bridging LTE modem, or in a bridging NR modem, or in an Address Resolution Protocol (ARP) agent of the bridging LTE modem, or in an Address Resolution Protocol (ARP) agent of the bridging NR modem.

Figure 2:
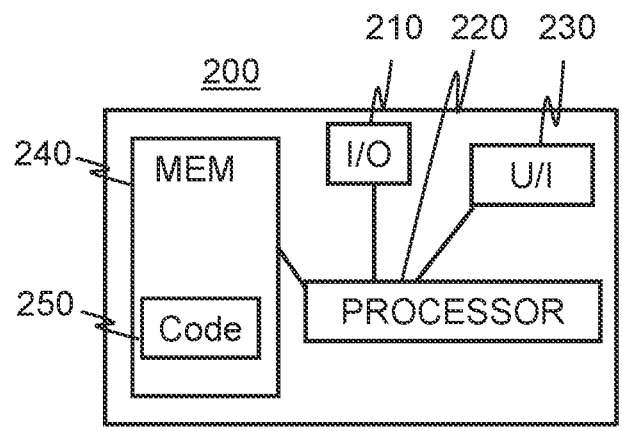
FIG. 2 shows a block diagram of an apparatus of an example embodiment.

FIG. 2 shows a block diagram of an apparatus 200 according to an example embodiment. The apparatus 200 may operate as a network element, such as the network element 103 of FIG. 1, or as a UE, such as the UE 101 of FIG. 1. The apparatus 200 generally comprises a memory 240 including a computer program code 250. The apparatus 200 further comprises a processor 220 for controlling the operation of the apparatus 200 using the computer program code 250, and a communication unit 210 for communicating with other nodes. Further, the apparatus 200 may comprise a user interface unit 230.

The communication unit 210 comprises, for example, one or more of: a local area network (LAN) port; a wireless local area network (WLAN) unit; Bluetooth unit; cellular data communication unit; or satellite data communication unit. The communication interface 210 may support one or more different communication technologies. The communication interface 210 may support Ethernet communications and/or IP based communications. The apparatus 200 may also or alternatively comprise more than one of the communication interfaces 210. The processor 220 comprises, for example, any one or more of: a master control unit (MCU); a microprocessor; a digital signal processor (DSP); an application specific integrated circuit (ASIC); a field programmable gate array; and a microcontroller. The user interface unit 230 may comprise a circuitry for receiving input from a user of the apparatus 200, e.g., via a keyboard; graphical user interface of a display; speech recognition circuitry; or an accessory device; such as a headset; and for providing output to the user via, e.g., a graphical user interface or a loudspeaker. Various parts of the apparatus 200 may also be distributed, virtualized, or implemented using cloud computing. Also, various parts may be implemented using more than one corresponding or different elements, such as memories and storages may be multiplied for capacity and/or redundancy purposes. Similarly, processing and/or communications may be implemented with multiple parallel or elements for capacity and/or redundancy purposes.

FIG. 3 shows a flow chart of a process of an example embodiment. The process may be implemented for example in the UE 101 or network element 103 of FIG. 1 or in apparatus 200 of FIG. 2. The process comprises the following steps:

301: Performing Ethernet communication for transmitting and receiving Ethernet frames.

302: Performing IP communication for transmitting and receiving IP data packets over a cellular network.

303: Transforming Ethernet frames to IP data packets and vice versa for enabling Ethernet communication over IP transport.

304: Maintaining a header transformation table between Ethernet and IP traffic flows. The header transformation table may comprise Ethernet addresses and respective IP addresses.

The transforming step comprises using the header transformation table and performing header transformation by removing Ethernet headers from received Ethernet frames and including Ethernet payload in IP data packets. Further the header transformation comprises reconstructing Ethernet headers for received IP data packets for transmission of payload from the IP data packets in Ethernet frames.

In an example, the header transformation table may map dynamically learned or statically configured Ethernet MAC addresses on or behind UEs to LTE or 5G bearers identified by Tunnel Endpoint IDs, TEIDs, and connected physical and logical ports (e.g. Virtual Local Area Network, VLAN) in the broadcast domain for forwarding purposes.

305: The process further comprises using IPv6 headers of IP data packets to carry information from removed Ethernet headers in the transforming step. The information contained in the IPv6 headers may then be used in reconstruction of the original Ethernet frame at both ends of IP transport. In this way it is achieved that dynamic information of the removed Ethernet headers can be carried over IP transport without adding significant overhead. This enables transport of dynamic information that cannot be reconstructed based on preconfigured rules or actively signaled values.

Stripping (i.e. removing) the original Ethernet header and encoding at least some of the removed information using IPv6 header and only carrying the Ethernet payload as IPv6 payload reduces the transmission overhead when compared to tunnel solutions that encapsulate the entire Ethernet frame and carry it with additional encapsulation headers as IP payload.

The transforming step may further comprise using source and destination address fields of IPv6 headers of IP data packets to carry source and destination addresses of the removed Ethernet frames. Additionally or alternatively, the transforming step may further comprise using traffic class and flow label fields of IPv6 headers of IP data packets to carry dynamic information from the removed Ethernet headers.

In an example embodiment, source and destination Ethernet MAC addresses are encoded as IPv6 link local addresses into source and destination IP addresses. Ethernet Broadcast address may be encoded as a specific link local multicast address that is then understood as Ethernet broadcast and flooded accordingly.

It is possible that Ethernet network needs to be segmented to multiple segments for example for security reasons. These segments are called Virtual LANs, identified by VLAN identifier (VID) in the Ethernet VLAN header. Operators may differentiate and prioritize traffic, which is possible by defining class of service (CoS) identified by the Ethernet Priority code point (PCP) in the Ethernet VLAN header.

In an example embodiment, CoS, VID and other information in the Ethernet header is encoded to the traffic class and flow label fields of IPv6 headers. Ethernet Priority code point (PCP) may be encoded in the traffic class field. Ethernet Drop eligible indicator (DEI) and VLAN identifier (VID) may be encoded in the flow label field.

Additionally or alternatively, further data can be included in the IPv6 header fields. For example, the flow label field and the hop limit field of the IPv6 header are normally unused on the one-hop packet data convergence protocol, PDCP, transport of IP data packets between a UE 101 and a core network 110, and thus may have room to accommodate further information.

In an example embodiment, Tag Protocol Identifier (TPID) is encoded in the IPv6 flow label field. Absolute TPID value may be encoded or a reference to a mapping table of supported TPIDs may be used. By using the mapping table only few bits are needed for indicating the TPID in the IPv6 header as number of supported TPIDs may be small.

Further, it is to be noted that both ends of the IP transport (e.g. UE, P-GW, and/or UPF) may remove and add additional 802.1q headers to the Ethernet packets received from bearers or physically or logically connected Ethernet ports. This would enable further use cases such as Q-in-Q and/or direct 802.1q header rewrite and/or other use of additional 802.1q headers.

Still further, the transforming step may comprise using IPv6 fragmentation header to enable transport of Ethernet payloads that are larger than the IP data packets can accommodate. Ethernet doesn't natively allow packet fragmentation, but this feature provides the effect of enabling that larger Ethernet can be carried over Maximum Transmission Unit (MTU) restricted paths.

The transforming and maintaining steps may enable Ethernet communication for example between an industrial Ethernet application of user equipment and one or more industrial Ethernet hosts, or between multiple industrial Ethernet hosts. In an embodiment, an industrial Ethernet host may be a moving host (e.g. a robot) that uses cellular network for providing connectivity. Such a moving host could be connected to a UE and use the UE for connectivity, for example.

In an example embodiment, the address resolution mechanisms of TCP/IP are used for enabling mobility. As an example, UE may use the address resolution mechanisms of TCP/IP to acquire a new IP address for Ethernet over IP transport, if needed after a cellular handover. A new IP may be needed for example due to a change of P-GW or UPF for the radio bearer the UE is using.

FIGS. 4-8 show signaling diagrams of some example embodiments. Time advances from the top towards the bottom in the diagrams.

FIG. 4 provides signaling example suited for example for the system of FIG. 1. FIG. 4 shows UE 101, a network element 103, and an Ethernet host 104. The UE comprises an industrial Ethernet application 403 and a modem unit 401.

In first phase, IP address is acquired and MAC address for destination is resolved.

411: Initialization (Attach, IP address request and ARP request)

412: Initialization done (Attached, received IP address and resolved ARP request)

In second phase, data is transmitted.

413: The industrial Ethernet application 403 sends data (Ethernet frames).

414: The modem unit 401 strips Ethernet headers and inserts IP headers to move the traffic flow towards network core over IP transport. IP header and VLAN tag are pushed.

415: The network element 103 strips IP headers and VLAN tag and reconstructs Ethernet headers to move the traffic flow to the Ethernet host 104 in Ethernet frames.

416: The Ethernet host 104 sends data (Ethernet frames).

417: The network element 103 strips Ethernet headers and inserts IP headers to move the traffic flow towards the UE 101 over IP transport. IP header and VLAN tag are pushed.

418: The modem unit 401 strips IP headers and VLAN tag and reconstructs Ethernet headers to move the traffic flow to the industrial Ethernet application 403 in Ethernet frames.

FIGS. 5-8 provide examples related LTE networks.

FIG. 5 relates to an example scenario, where UE communicates with one factory site. FIG. 5 shows UE 101, a SAEGW 503, a first Ethernet host 104 (Ethernet host 1) and a second Ethernet host 105 (Ethernet host 2). The UE 101 comprises an industrial Ethernet application 403, operating system (OS) 402, and a bridging LTE modem 401.

The first messages of FIG. 5 involve LTE session establishment between the bridging LTE modem 401 and the SAEGW 503: UE Attach and Default bearer creation and optionally dedicated bearer creation for QoS Class Identifier (QCI). Then UE OS 402 requests an IP address for the UE from a Dynamic Host Configuration Protocol (DHCP) server from SAEGW 503 in the same LAN. Alternatively, the UE OS 402 may allocate the IP address from a local pool.

After acquiring IP address, UE cannot use Address Resolution Protocol (ARP)/Neighbor Discovery Protocol (NDP) for its neighbors as it is behind the LTE and that is the fundamental requirement for pure Ethernet based communications. Therefore, UE OS 402 sends ARP Request message targeted towards the Ethernet host 1. The UE 101 knows IP address of the Ethernet host 1 from its configuration and so sets it as target IP address, and broadcasts the message in order to know MAC address of the Ethernet host 1.

At the bridging LTE modem 403, an ARP agent (a software component residing at the bridging LTE modem 403) upon receiving the ARP request, triggers address resolution to a SAEGW manager (a software component residing at the SAEGW 503). The ARP agent and the SAEGW manager maintain a header transformation table of obtained/resolved MAC and IP addresses. As data goes across the ARP agent and the SAEGW manager, addresses are looked up and headers are transformed accordingly (stripping and regeneration of Ethernet and IP headers) in order to carry data forward.

Upon receiving the trigger message, the SAEGW manager sends ARP request for the Ethernet host 1 and MAC address of the Ethernet host 1 is resolved. The ARP reply from the Ethernet host 1 contains MAC address of the Ethernet host 1 and is destined towards the UE OS 402. The ARP reply flows through the SAEGW 503 and the bridging LTE modem 401 and terminates at the UE OS 402.

The content of the ARP request (source IP address, destination IP address, source MAC address, destination MAC address) is (UE OS, Ethernet host 1, UE OS, broadcast). The content of the ARP reply (source MAC address, destination MAC address) is (Ethernet host 1, UE OS).

Now the UE 101 has successfully resolved the MAC address for the Ethernet host 1 and may thereby start data transmission (raw Ethernet data) from the industrial Ethernet application 403 to the Ethernet host 1. In the data transmission from the industrial Ethernet application 403 to the Ethernet host 1, Ethernet header is stripped and IP header is inserted at the bridging LTE modem 403 to forward the transmission to the SAEGW manager. At the SAEGW manager, IP header is removed and Ethernet header is regenerated to forward the transmission to the Ethernet host 1. For the data transmission in the other direction, Ethernet header is stripped and IP header inserted at the SAEGW manager to forward the transmission to the bridging LTE modem 401. At the bridging LTE modem 401, IP header is removed and Ethernet header is regenerated to forward the transmission to the industrial Ethernet application 403.

FIG. 6 relates to an example scenario, where UE communicates with multiple Ethernet hosts of multiple factory sites. FIG. 6 shows UE 101, a SAEGW 503, a first Ethernet host 104 (Ethernet host 1) and a second Ethernet host 105 (Ethernet host 2). The UE 101 comprises an industrial Ethernet application 403, operating system (OS) 402, and a bridging LTE modem 401.

For simplicity it is considered that the UE 101 has already connected to the Ethernet host 1 and these messages are not shown in FIG. 6. The signaling diagram of FIG. 6 shows messages between the UE 101 and the Ethernet host 2. The messaging flow is similar to that between the UE 101 and the Ethernet host 1 in FIG. 5.

In principle, same message flow is applicable for communication between the UE and multiple Ethernet hosts within the same factory site.

FIG. 7 relates to an example scenario, where Ethernet hosts communicate with each other. FIG. 7 shows a SAEGW 503, a first Ethernet host 104 (Ethernet host 1) and a second Ethernet host 105 (Ethernet host 2). The Ethernet host 1 comprises an industrial Ethernet application 403, operating system (OS) 402, and a bridging LTE modem 401.

The message flow in FIG. 7 is similar to that shown in FIG. 5.

FIG. 8 relates to an example scenario, where UE communicates with one factory site the same way as in FIG. 5. FIG. 8 shows UE 101, a SAEGW 503, a first Ethernet host 104 (Ethernet host 1) and a second Ethernet host 105 (Ethernet host 2). The UE 101 comprises an industrial Ethernet application 403, operating system (OS) 402, and a bridging LTE modem 401.

In this example IPv6 header fields are used for carrying the MAC addresses at the bridging LTE modem 401 and the SAEGW 503. In this way, there is no need for active signaling between an ARP agent of the bridging LTE modem 401 and a SAEGW manager of the SAEGW 503 to exchange MAC addresses.

The first messages of FIG. 8 involve LTE session establishment between the bridging LTE modem 401 and the SAEGW 503: UE Attach and Default bearer creation and optionally dedicated bearer creation for QoS Class Identifier (QCI). Then UE OS 402 requests an IP address for the UE from a Dynamic Host Configuration Protocol (DHCP) server from SAEGW 503 in the same LAN. Alternatively, the UE OS 402 may allocate the IP address from a local pool. IPv4 and IPv6 bearers are created.

Acquiring IP address and resolving MAC address of the Ethernet host 1 are performed similarly to FIG. 5.

After successful resolution of the MAC address for the Ethernet host 1 the UE 101 may start data transmission (raw Ethernet data) from the industrial Ethernet application 403 to the Ethernet host 1. In the data transmission from the industrial Ethernet application 403 to the Ethernet host 1, Ethernet header is stripped and IPv6 header is inserted at the bridging LTE modem 403 to forward the transmission to the SAEGW manager. IPv6 link local address parameters are set as: source address: UE OS, and destination address: Ethernet host 1. At the SAEGW manager, IPv6 header is removed and Ethernet header is regenerated to forward the transmission to the Ethernet host 1. Source and destination MAC addresses are taken from the IPv6 local link headers. In this way, no control plane protocol is needed at the ARP agent/bridging LTE modem and SAEGW manager/SAEGW. For the data transmission in the other direction, the SAEGW manager and the bridging LTE modem 403 perform the opposite operations. That is, Ethernet header is stripped and IPv6 header inserted at the SAEGW manager to forward the transmission to the bridging LTE modem 401. At the bridging LTE modem 401, IPv6 header is removed and Ethernet header is regenerated to forward the transmission to the industrial Ethernet application 403.

As used in this application, the term "circuitry" may refer to one or more or all of the following:

(a) hardware-only circuit implementations (such as implementations in only analog and/or digital circuitry) and;
(b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It is to be noted that the terms reconstruct and regenerate are used interchangeably in present disclosure in connection with header transformation.

Without in any way limiting the scope, interpretation, or application of the claims appearing below, a technical effect of one or more of the example embodiments disclosed herein is that there is provided an improved or at least an alternative way of transporting Ethernet frames over IP transport. Another technical effect of one or more of the example embodiments disclosed herein is that transmission overhead may be reduced. The effect of tunnelling overhead on small packets, such as ARP Reply/Request or TCP SYN/ACK/FIN/RST, is proportionally quite high. For example, a tunnelling solution may cause 64 bytes of header overhead, while embodiments of present disclosure may reduce the header overhead to 14 bytes.

Yet another technical effect of one or more of the example embodiments disclosed herein is that management and configuration overhead may be reduced. For example, compared to a tunneling solution, one or more example embodiments disclosed herein provide simplified network configuration and maintenance by eliminating need for active signaling protocols and static configurations for maintaining the tunnels.

Embodiments of the present disclosure may be implemented in software, hardware, application logic or a combination of software, hardware, and application logic. The software, application logic and/or hardware may reside e.g. on the network element 103 or on the UE 101. In an example embodiment, the application logic, software, or an instruction set is maintained on any one of various conventional computer-readable media. In the context of this document, a "computer-readable medium" may be any non-transitory media or means that can contain, store, communicate, propagate, or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of present disclosure are set out in the independent claims, other aspects may comprise other combinations of features from the described embodiments and/or the dependent claims with the features of the independent claims, and not solely the combinations explicitly set out in the claims.

It is also noted herein that while the foregoing describes example embodiments, these descriptions should not be viewed in a limiting sense. Rather, there are several variations and modifications which may be made without departing from the scope of the present disclosure as defined in the appended claims.

The invention claimed is:

1. An apparatus comprising at least one processor and at least one memory including computer program code, the at least one memory and computer program code configured to, with the at least one processor, cause the apparatus at least to perform:
   Ethernet communication for transmitting and receiving Ethernet frames;
   IP communication for transmitting and receiving IP data packets over a cellular network;
   transforming Ethernet frames to IP data packets and vice versa for enabling Ethernet communication over IP transport; and
   maintaining a header transformation table between Ethernet and IP traffic flows; wherein said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using traffic class and flow label fields of IPv6 headers of IP data packets to carry dynamic information from the removed Ethernet headers.

2. The apparatus of claim 1, wherein said transforming comprises using source and destination address fields of IPv6 headers of IP data packets to carry source and destination addresses of the removed Ethernet frames.

3. The apparatus of claim 1, wherein the header transformation table comprises Ethernet addresses and respective IP addresses.

4. The apparatus of claim 1, wherein said transforming comprises using IPv6 fragmentation header to enable transport of Ethernet payloads that are larger than the IP data packets can accommodate.

5. The apparatus of claim 1, wherein said transforming and said maintaining a header transformation table further comprise enabling Ethernet communication between an industrial Ethernet application of user equipment and an industrial Ethernet host.

6. The apparatus of claim 1, wherein the apparatus is a network element of a cellular core network.

7. The apparatus of claim 6, wherein the apparatus is a packet data network gateway, P-GW, node of a system architecture evolution gateway, SAEGW, in an evolved packet core network.

8. The apparatus of claim 6, wherein the apparatus is a user plane function, UPF, node in a 5G core network.

9. The apparatus of claim 1, wherein the apparatus is, or is comprised in, user equipment.

10. The apparatus of claim 9, wherein the at least one memory and computer program code configured to, with the at least one processor, cause the apparatus at least to further perform acquiring a new IP address for Ethernet over IP transport, if needed after a cellular handover, wherein the new IP address is obtained using the address resolution mechanisms of TCP/IP.

11. The apparatus of claim 9, wherein the apparatus is a bridging LTE modem of user equipment.

12. The apparatus of claim 9, wherein the apparatus is a bridging NR modem of user equipment.

13. A method, comprising:
   performing Ethernet communication for transmitting and receiving Ethernet frames;
   performing IP communication for transmitting and receiving IP data packets over a cellular network;
   transforming Ethernet frames to IP data packets and vice versa for enabling Ethernet communication over IP transport; and
   maintaining a header transformation table between Ethernet and IP traffic flows; wherein said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using traffic class and flow label fields of IPv6 headers of IP data packets to carry dynamic information from the removed Ethernet headers.

14. A non-transitory computer readable memory medium having stored therein a computer program comprising instructions for causing an apparatus to perform at least the following:
   Ethernet communication for transmitting and receiving Ethernet frames;
   IP communication for transmitting and receiving IP data packets over a cellular network;
   transforming Ethernet frames to IP data packets and vice versa for enabling Ethernet communication over IP transport; and
   maintaining a header transformation table between Ethernet and IP traffic flows; wherein said transforming comprises using the header transformation table and performing header transformation by removing Ethernet headers from received Ethernet frames and including Ethernet payload in IP data packets, and by reconstructing Ethernet headers for received IP data packets for transmission of payload from the IP data packets in Ethernet frames; and wherein said transforming comprises using traffic class and flow label fields of IPv6 headers of IP data packets to carry dynamic information from the removed Ethernet headers.

* * * * *